(12) United States Patent
Torman et al.

(10) Patent No.: US 10,394,412 B2
(45) Date of Patent: *Aug. 27, 2019

(54) USER-CUSTOMIZABLE PERMISSIONS IN A COMPUTING ENVIRONMENT

(71) Applicant: salesforce.com, inc., San Francisco, CA (US)

(72) Inventors: Adam Torman, Walnut Creek, CA (US); John Arlan Brock, Oakland, CA (US); Anjesh Dubey, Union City, CA (US); Jimmy Hua, San Francisco, CA (US); Aris Chang, Emeryville, CA (US); Bharath Kumar Pareek, Union City, CA (US); Sukrutha Raman Bhadouria, San Francisco, CA (US); Belinda Wong, San Bruno, CA (US)

(73) Assignee: salesforce.com, inc., San Francisco, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/621,874

(22) Filed: Jun. 13, 2017

(65) Prior Publication Data

US 2018/0129359 A1    May 10, 2018

Related U.S. Application Data

(63) Continuation of application No. 14/559,749, filed on Dec. 3, 2014, now Pat. No. 9,710,127.
(Continued)

(51) Int. Cl.
*G06F 3/0481* (2013.01)
*H04L 29/06* (2006.01)
*H04L 29/08* (2006.01)

(52) U.S. Cl.
CPC .......... *G06F 3/0481* (2013.01); *H04L 63/105* (2013.01); *H04L 63/20* (2013.01); *H04L 67/1002* (2013.01)

(58) Field of Classification Search
CPC ... H04L 63/20; H04L 63/105; H04L 67/1002; G06F 3/0481
See application file for complete search history.

(56) References Cited

U.S. PATENT DOCUMENTS 5,577,188 A    11/1996  Zhu
5,608,872 A    3/1997   Schwartz et al.
(Continued)

OTHER PUBLICATIONS

U.S. Appl. No. 15/218,468, filed Jul. 25, 2016, Torman et al.
(Continued)

*Primary Examiner* — Joseph P Hirl
*Assistant Examiner* — Thomas A Gyorfi
(74) *Attorney, Agent, or Firm* — Weaver Austin Villeneuve & Sampson LLP

(57) ABSTRACT

Disclosed are examples of systems, apparatus, methods and computer program products for providing user-customizable permissions governing user access to computing resources in a computing system. For example, a database storing data objects identifying permissions of users, sets of the permissions, and users can be maintained. One or more fields can be displayed on a display of a user device. The one or more fields can be configured to receive input to perform one or more operations. Input can be received from a user via the user interface on the display of the user device. One or more operations can be performed. The database can be updated such that the data objects identify a custom permission or a permission set to which a custom permission has been assigned.

20 Claims, 10 Drawing Sheets

Related U.S. Application Data

(60) Provisional application No. 62/062,012, filed on Oct. 9, 2014.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,973,106 B2 | 3/2015 | Warshavsky et al. |
| 9,628,493 B2 | 4/2017 | Warshavsky et al. |
| 9,710,127 B2 | 7/2017 | Torman et al. |
| 9,774,603 B2 | 9/2017 | Brock |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0105648 A1 | 6/2003 | Schurenberg et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |

(56) References Cited

U.S. PATENT DOCUMENTS

| | | |
|---|---|---|
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0156021 A1 | 7/2006 | Minium et al. |
| 2008/0201766 A1 | 8/2008 | Amirov et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0055399 A1 | 3/2011 | Tung et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0227652 A1* | 8/2013 | Choi ............... G06F 9/445 726/4 |
| 2013/0247216 A1 | 9/2013 | Cinarkaya et al. |
| 2014/0006441 A1 | 1/2014 | Torman et al. |
| 2014/0068718 A1 | 3/2014 | Mureinik |
| 2014/0289796 A1 | 9/2014 | Moloian et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0058460 A1 | 2/2015 | Seago |
| 2015/0095162 A1 | 4/2015 | Jakobson et al. |
| 2015/0106736 A1 | 4/2015 | Torman et al. |
| 2015/0127670 A1 | 5/2015 | Torman et al. |
| 2015/0142596 A1 | 5/2015 | Jakobson et al. |
| 2015/0163206 A1 | 6/2015 | McCarthy et al. |
| 2015/0172563 A1 | 6/2015 | Jakobson et al. |
| 2016/0041976 A1 | 2/2016 | Pradeep et al. |
| 2016/0125527 A1 | 6/2016 | Marinova |
| 2017/0075922 A1 | 3/2017 | Torman et al. |
| 2017/0076012 A1 | 3/2017 | Sreenivasa et al. |
| 2018/0025113 A1 | 1/2018 | Torman et al. |
| 2018/0095733 A1 | 4/2018 | Torman et al. |
| 2018/0095790 A1 | 4/2018 | Pradeep et al. |
| 2018/0096012 A1 | 4/2018 | Warshavsky et al. |
| 2018/0096013 A1 | 4/2018 | Warshavsky et al. |
| 2018/0096020 A1 | 4/2018 | Sreenivasa et al. |
| 2018/0096024 A1 | 4/2018 | Bitting et al. |
| 2018/0096165 A1 | 4/2018 | Warshavsky et al. |
| 2018/0096613 A1 | 4/2018 | Torman et al. |

OTHER PUBLICATIONS

U.S. Appl. No. 15/281,559, filed Sep. 30, 2016, Pradeep et al.
U.S. Appl. No. 15/283,119, filed Sep. 30, 2016, Warshavsky et al.
U.S. Appl. No. 15/283,130, filed Sep. 30, 2016, Warshavsky et al.
U.S. Appl. No. 15/283,145, filed Sep. 30, 2016, Warshavsky et al.
U.S. Appl. No. 15/455,433, filed Mar. 10, 2017, Bitting et al.
U.S. Appl. No. 15/455,452, filed Mar. 10, 2017, Sreenivasa et al.
U.S. Appl. No. 15/479,729, filed Apr. 5, 2017, Torman et al.
U.S. Appl. No. 15/487,874, filed Apr. 14, 2017, Torman et al.
U.S. Non-Final Office Action dated Aug. 12, 2016, issued in U.S. Appl. No. 14/559,749.
U.S. Notice of Allowance dated Mar. 16, 2017, issued in U.S. Appl. No. 14/559,749.
"Google Plus Users", Google+Ripples, Oct. 31, 2011 [retrieved on Feb. 21, 2012 from Internet at http://www.googleplusers.com/google-ripples.html], 3 pages.

* cited by examiner

USER-CUSTOMIZABLE PERMISSIONS IN A COMPUTING ENVIRONMENT

PRIORITY DATA

This patent document is a continuation of and claims priority to and commonly assigned U.S. patent application Ser. No. 14/559,749, titled "User-Customizable Permissions in a Computing Environment," by Torman et al., filed on Dec. 3, 2014, which claims priority to U.S. Provisional Patent Application No. 62/062,012, titled "User-Customizable Permissions in a Computing Environment", by Torman et al., filed on Oct. 9, 2014. The entire disclosures of U.S. patent application Ser. No. 14/559,749 and U.S. Provisional Patent Application No. 62/062,012 are hereby incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to providing user-customizable permissions. More specifically, this patent document discloses techniques for providing user-customizable permissions governing user access to computing resources in a computing system.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program providing user-customizable permissions governing user access to computing resources in a computing system. These drawings in no way limit any changes in form and detail that may be made by one skilled in the art without departing from the spirit and scope of the disclosed implementations.

DETAILED DESCRIPTION

Figure 1:
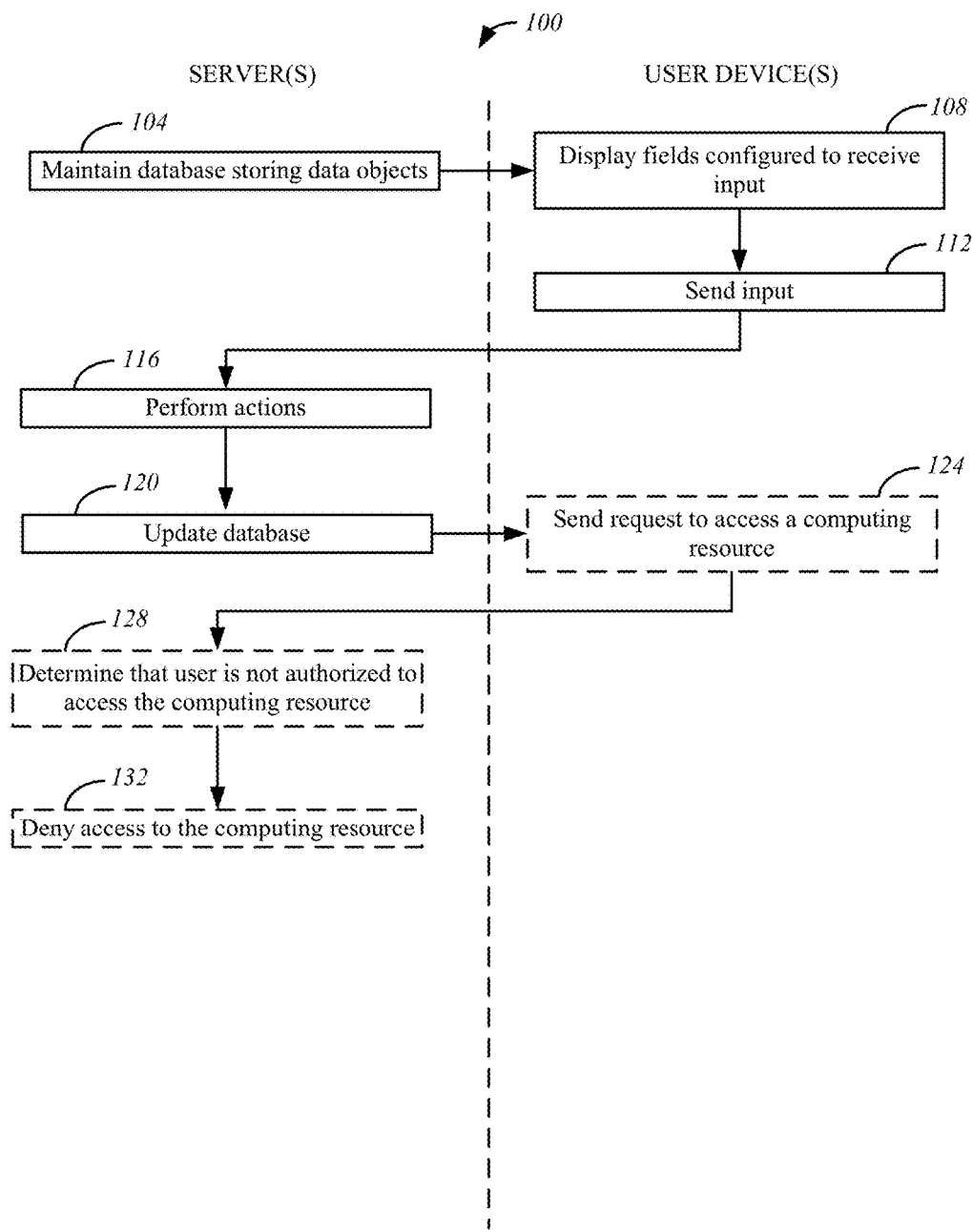
FIG. 1 shows a flowchart of an example of a computer-implemented method 100 for providing user-customizable permissions governing user access to computing resources in a computing system, performed in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for providing user-customizable permissions. As discussed herein, permissions generally govern access to computing resources such as data objects, components, and other entities of a computing system. Some permissions, referred to herein as "custom permissions", can be defined in a customized manner by users of a computing system. In some examples, permissions can be managed and assigned via permission sets. Multiple permission sets may be assigned to a user of a system in order to grant the user access to a variety of resources. A permission set can be structured as a container of permissions. Permission sets can be assigned directly to a user, with permissions layered to provide one or more rights needed to access computing resources in a computing system such as an on-demand database service environment, including, but not limited to: objects, fields, pages, programmatic functions, identity service providers, and general functions.

In a conventional enterprise environment, management of non-customizable permissions and permission sets can be burdensome, requiring an extensive knowledge of computer programing. By way of example, Esther is the Chief Executive Officer (CEO) of Bleak Property, a property management company. Bleak Property has over 200 employees with roles varying from temporary administrative assistants, to accountants, to realtors. Employees who deviate from that role can hurt the business. For example, Richard, a realtor, excels at selling property but is terrible at accounting. If Richard were given the authority to approve expense reports, he might misunderstand some numbers on an expense report, making an accounting error that costs Bleak Property a huge amount of money. On the other hand, Ada, an accountant in charge of approving expense reports at Bleak Property needs to have the ability to approve expense reports to do her job. Unfortunately, Esther's current enterprise platform does not have a predefined capability to give Ada the authority to approve expense reports and deny such authority to Richard. While Esther is an incredibly skilled business woman, she has no knowledge of computer programing to define and assign the exact permissions that she would like to give her employees and lacks the time to learn. Additionally, she has neither the funding nor the capacity to hire a programmer to customize her permissions.

Some of the disclosed techniques can be implemented to allow users to create and manage permissions declaratively. By way of example, a graphical user interface (GUI) can be provided on a computing device that is configured to allow a user to define custom permissions, add custom permissions to permission sets, and assign permission sets to users. A user's input can be stored in a database containing both custom and pre-defined permissions. However, unlike pre-defined permissions, custom permissions can be defined granularly to meet the needs of a variety of users, as discussed more detail in the context of examples of implementations. Thus, in the aforementioned example, Esther can use such a GUI to generate a custom permission allowing users to approve expense reports and assign that custom permission to an "Expense Approver" permission set. Esther can assign the Expense Approver permission set to Ada, such that Ada has permission to approve expense reports. Along the same lines, Esther can choose not to assign the Expense Approver permission set to Richard so he will not be able to approve expense reports.

Custom permissions can be assigned to a variety of computing resources in a number of manners, as discussed in more detail below. For instance, the content of a presentation displayed on a user's device can differ depending on the permissions of the user. By way of illustration, if Richard, a realtor, views an expense report page he might see an array of editable fields that he can use to fill out an expense report. On the other hand, if Ada, who has the Expense Approver permission set, views the same page, she might not be able to edit the same fields as Richard, but instead she might see a button that allows her to approve or deny the expense report. Ada might also see an editable field in which she can comment on the expense report.

Also or alternatively, permissions can be shared across organizations and systems to increase efficiency. By way of illustration, Bleak Property uses Salesforce.com® to manage their Customer Relationship Management (CRM) records. On the other hand, Bleak Property uses Concur® to handle their travel and expense needs. Bleak Property can use Salesforce.com® to generate a customized Expense Approver permission set and request that Salesforce.com® share the Expense Approver permission set with Concur®. At this point, only those with the Expense Approver permission set will be able to approve expense reports in Concur®. Along these lines, Bleak Property can generate additional permission sets containing custom permissions using Salesforce.com® and share such permission sets with other systems and applications. In other words, Bleak Property can use Salesforce.com® as a directory service and source of truth for permissions to be used by other systems and applications.

As discussed further below, custom permissions and permission sets can be used to define licenses. By way of example, Bleak Property allows all individuals navigating their website to view a list of basic property management tips. On the other hand, only users who have paid for a license can view restricted fields or objects on the Bleak Property website. Thus, Bleak Property can generate a "Paid License" permission set containing custom permissions that allows users to view restricted fields or objects. Bleak Property can then assign the Paid License permission set to users who have paid for a license.

Custom permissions and permission sets can be used in conjunction with some computing systems incorporating a multi-tenant database in an on-demand service environment. For instance, the assignments of users and permission sets may be stored in one or more databases of an on-demand database service environment. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) is configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission can reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes.

Permission sets have licensing implications, because the specific permissions granted to a user may be limited by the user's license. For example, an employee's user license may not permit the employee to access manager data objects. Consequently, the employee user should not be assigned a permission set that includes permission to access manager data objects. One way to ensure that permission sets are not assigned to users in a way that violates their user licenses is to associate every permission set that is created with a user license, and to validate upon creation of the permission set that none of the permissions in the permission set violate the user license associated with the permission set. However, in situations where an administrator wishes to grant a single permission to multiple users with different user licenses, this system may require an administrator to create multiple permission sets having the same single permission in order to grant that permission to multiple users with different user licenses. As an example, if there are five different user license types, and an administrator wishes to assign an "API Enabled" permission to all users, the administrator would need to create five permission sets, each containing only the "API Enabled" permission, and each corresponding with one of the five different user licenses. The implementations described herein reduce this administrative overhead by creating only one "API Enabled" permission set, which may be assigned to users having different user license type.

As another example, an independent software vendor wishes to publish a custom application consisting of custom objects, fields, classes, and pages, to be accessed by all users of an organization in a multitenant database environment. The vendor may wish to create permission sets that grant access to the custom objects, fields, classes, and pages of the custom application to all users. The implementations described herein allow the vendor to create a single permission set that may be assigned to any license type to grant access to the vendor's application, making it easier for independent software vendors to install permissions with their custom applications, rather than creating one permission set for each license that may be available in an organization.

In some implementations described herein, a permission set may be created by an administrator without being associated with a user license. Validation of the permission set may not occur until the permission set is assigned to a user, at which point the server identifies the user license associated with the user and determines whether the permission set being assigned to the user violates the user license associated with the user. For example, a single "API Enabled" permission set may be created. This permission set may then be assigned to users of all license types, because all of the license types allow the "API Enabled" permission to be assigned to the users. This obviates the need to create an "API Enabled" permission set for each user license type.

In some implementations, when a permission set is modified to include additional permissions, the modification may be validated by the server, because the additional permissions may violate a user license of a user to whom the permission set is assigned. When the server receives a request to add one or more permissions to a permission set, the server identifies the users to whom the permission set is currently assigned, identifies the user licenses associated with those users, and then determines whether the additional permissions will violate any of the user licenses.

In addition to user licenses, other constraints may be implemented to determine what permissions a user may possess. User constraints may take the form of any logical grouping of metadata that has access controls. For example, other user constraint forms may include an online community, an application, a line of business, or an independent software vendor application. Having these flexible user constraints allows an administrator of a system to grant access to various system resources based on the needs of the business.

Figure 2A:
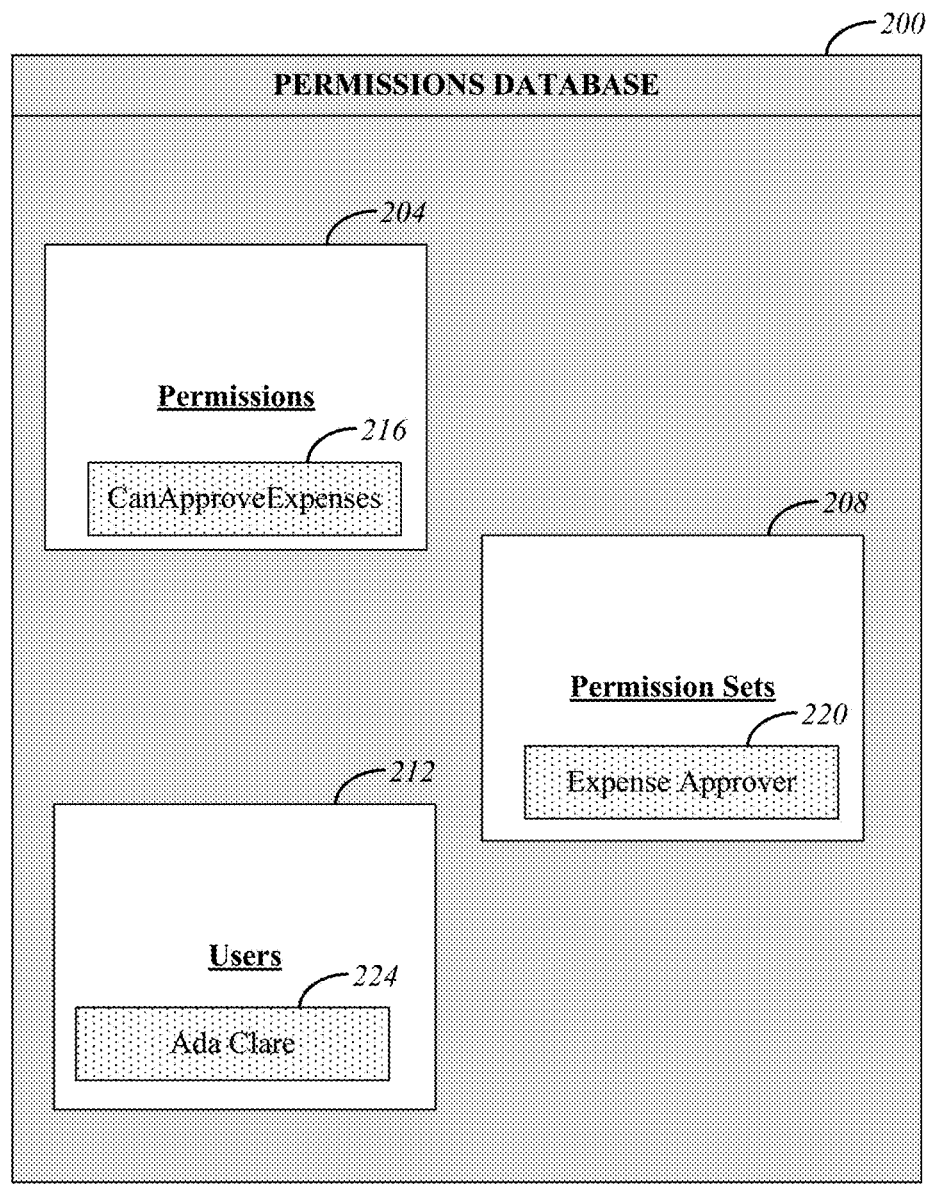
FIG. 2A shows a block diagram of an example of a Permissions Database 200, in accordance with some implementations.
Figure 2B:
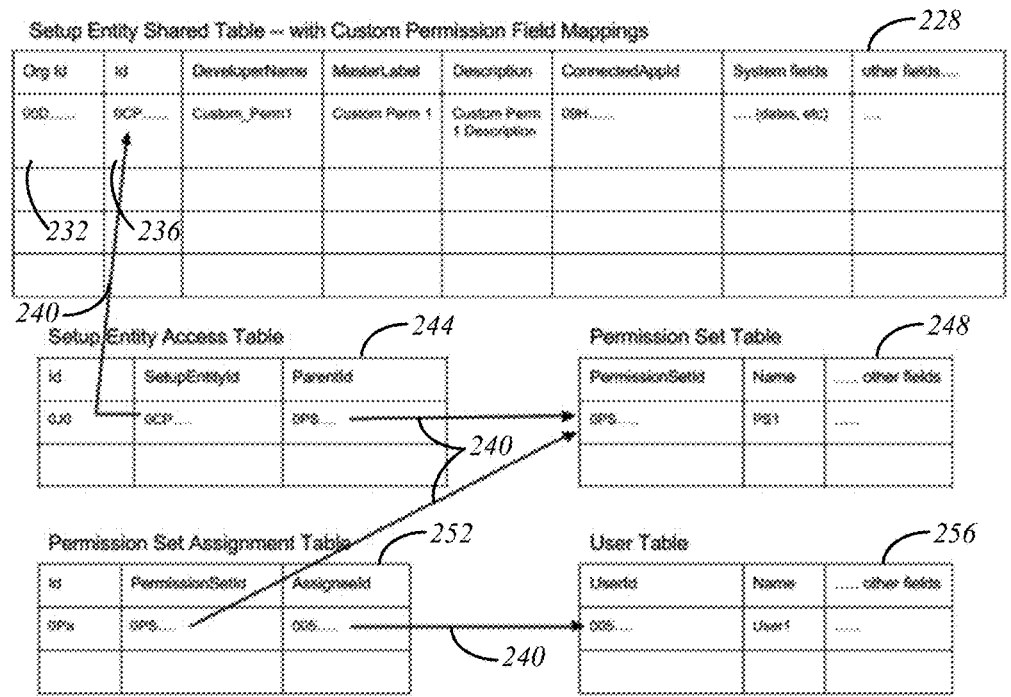
FIG. 2B shows examples of multi-object database tables stored in Permissions Database 200, in accordance with some implementations.
Figure 3:
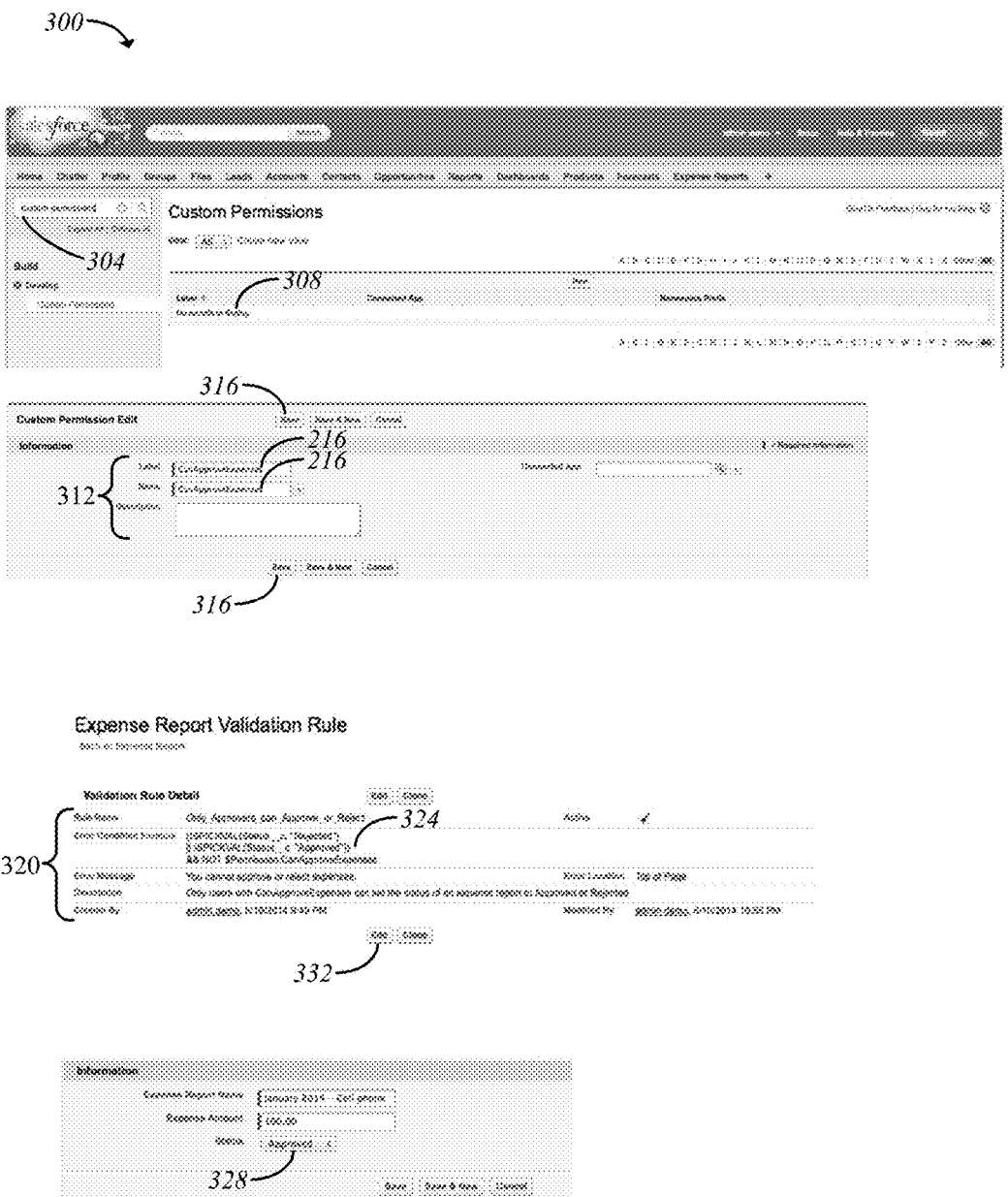
FIG. 3 shows an example of a presentation 300 for defining or updating custom permissions and associating custom permissions with computing resources in the form of a graphical user interface (GUI) as displayed on a computing device, in accordance with some implementations.
Figure 4:
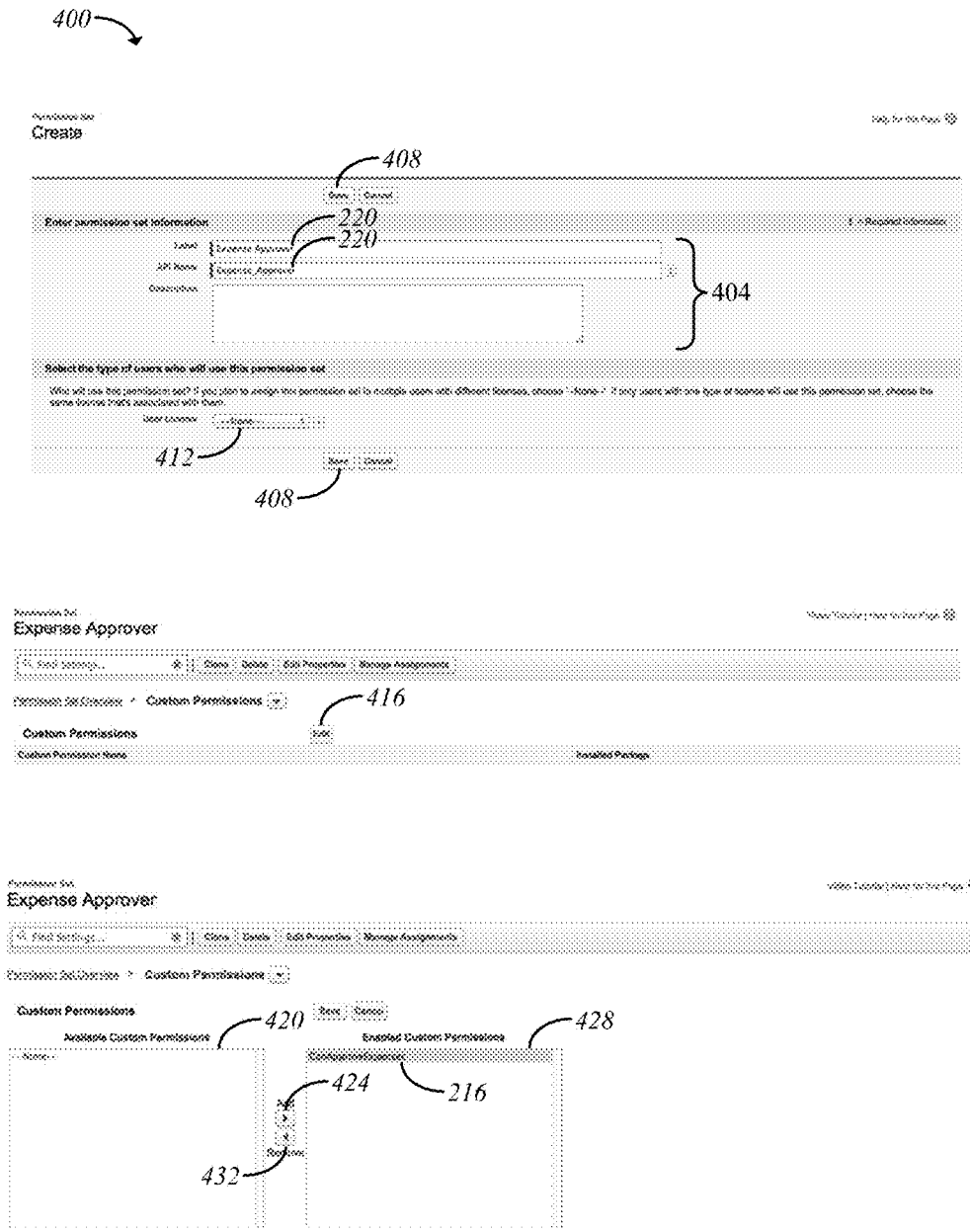
FIG. 4 shows an example of a presentation 400 for assigning custom permissions to permission sets in the form of a GUI as displayed on a computing device, in accordance with some implementations.
Figure 5:
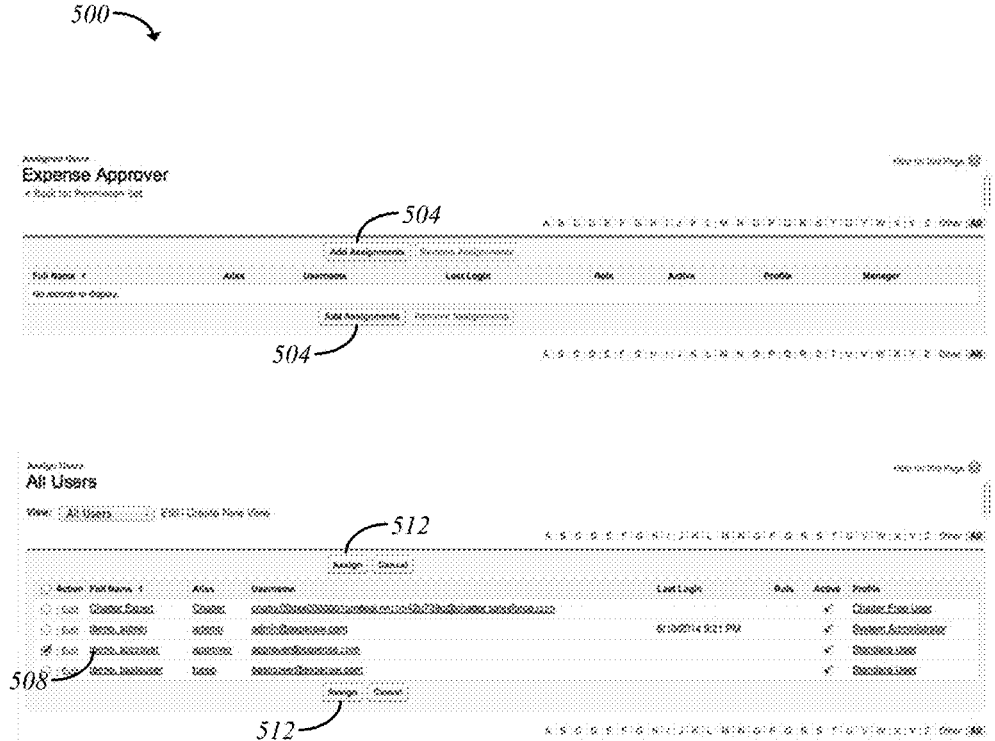
FIG. 5 shows an example of a presentation 500 for assigning permission sets to users in the form of a GUI as displayed on a computing device, in accordance with some implementations.
Figure 6A:
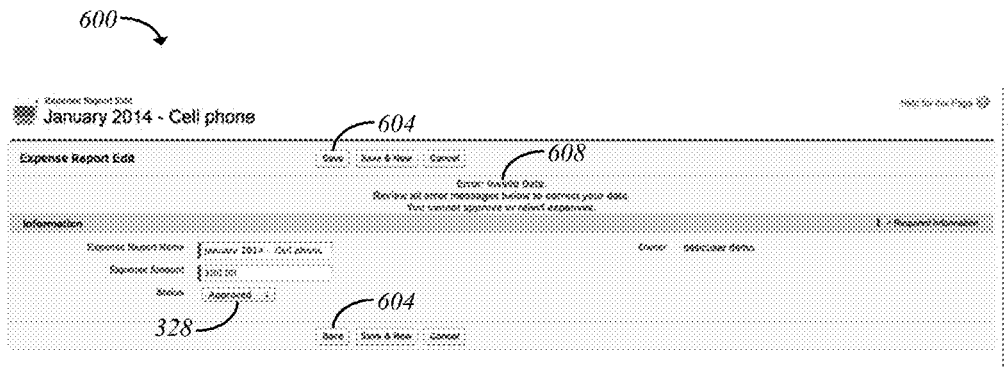
FIG. 6A shows an example of a presentation 600 in the form of a GUI as displayed on a computing device to illustrate custom permissions, in accordance with some implementations.
Figure 6B:
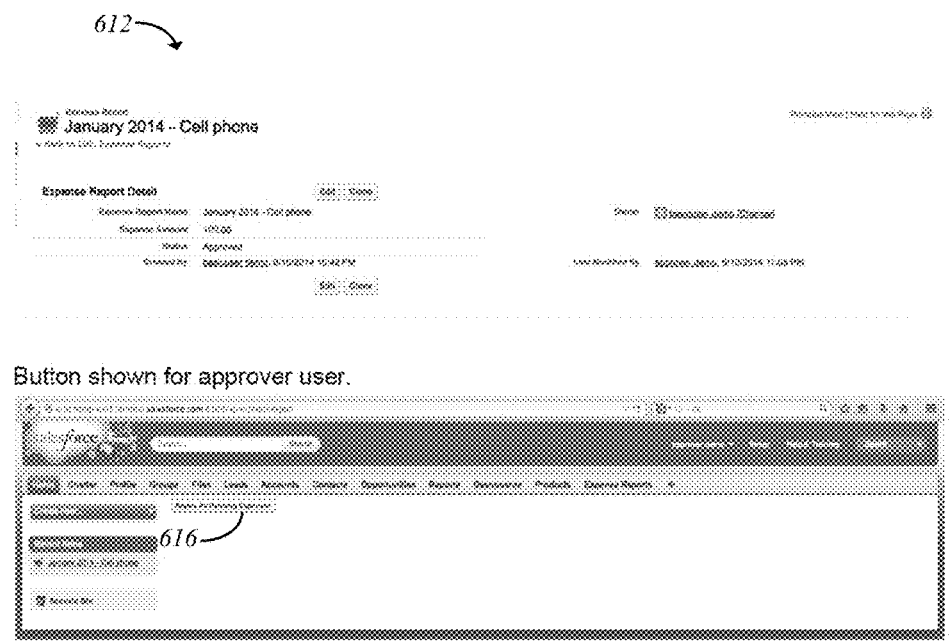
FIG. 6B shows an example of a presentation 612 in the form of a GUI as displayed on a computing device to illustrate custom permissions, in accordance with some implementations.

FIG. 1 shows a flowchart of an example of a computer-implemented method 100 for providing user-customizable permissions governing user access to computing resources in a computing system, performed in accordance with some implementations. FIG. 1 is described with reference to FIGS. 2-6B. FIG. 2A shows a block diagram of an example of a Permissions Database 200, in accordance with some implementations. FIG. 2B shows examples of multi-object database tables stored in Permissions Database 200, in accordance with some implementations. FIG. 3 shows an example of a presentation 300 for defining or updating custom permissions and associating custom permissions with computing resources in the form of a graphical user interface (GUI) as displayed on a computing device, in accordance with some implementations. FIG. 4 shows an example of a presentation 400 for assigning custom permissions to permission sets in the form of a GUI as displayed on a computing device, in accordance with some implementations. FIG. 5 shows an example of a presentation 500 for assigning permission sets to users in the form of a GUI as displayed on a computing device, in accordance with some implementations. FIG. 6A shows an example of a presentation 600 in the form of a GUI as displayed on a computing device to illustrate custom permissions, in accordance with some implementations. FIG. 6B shows an example of a presentation 600 in the form of a GUI as displayed on a computing device to illustrate custom permissions, in accordance with some implementations.

At 104 of FIG. 1, Permissions Database 200 of FIG. 2A is maintained. Permissions Database 200 can be maintained by servers on behalf of an organization such as Bleak Property, by a third party such as Salesforce.com®, or both. For example, Permissions Database 200 can form part of a database system 16 of FIGS. 7A and 7B. In some cases, permissions data can be stored in tenant data storage 22, described in greater detail below. Permissions Database 200 can store a wide variety of customizable data objects. For example, in FIG. 2A, some data objects in Permissions Database 200 might identify permissions of users 204. Permissions 204 can contain both pre-defined permissions and user-defined custom permissions. In some implementations, the operational characteristic of a permission can be independent of whether the permission is user-defined. For example, a user-defined custom permission can behave in the same way as a pre-defined permission when added to a permission set or assigned to a user as discussed below. Specific types of custom permissions can vary across implementations. For instance, CanApproveExpenses 216 is an example of a custom permission that governs whether a user can approve expense reports, as described in more detail below.

As discussed above, some data objects in Permissions Database 200 can identify user-defined permission sets 208. By way of example, Permissions Database 200 can contain the Expense Approver 220 permission set, which was generated by Esther, CEO of Bleak Property, to govern access to resources needed to approve and deny expense reports, as described below. Also or alternatively, some data objects in Permissions Database 200 might identify users 212 of Permissions Database 200 such as Ada Clare 224, an accountant at Bleak Property.

In some implementations, custom permissions can be represented and stored in a multitenant environment in a shared, multitenant, multi-object Database Table 228 of FIG. 2B. Custom permissions and other objects can be stored in the same table. Table 228 can be indexed on Organization Identifier 232 and an entity type identifier such as item 236 allowing for very fast retrieval of any object type, including custom permissions. Advantages of storing different objects in the same table can include highly optimized Structured Query Language (SQL) generation, extensibility, scalability and common access patterns between many different objects. Arrows 240 of FIG. 2B show relationships between Table 228 (storing custom permissions), Setup Entity Access Table 244 (storing information relating to whether custom permissions are enabled or assigned to permission sets or profiles), Permission Set Table 248 (storing permission sets), Permission Set Assignment Table 252 (storing permission set assignments to users), and User Table 256 (storing user identification information).

At 108 of FIG. 1, fields configured to receive input to perform a variety of actions are caused by a server device to be displayed in a user interface on a display of a user device. Such fields and user interfaces can vary across implementations. For example, presentation 300 of FIG. 3 with Fields 312 can be displayed at 108. Fields 312 are configured to receive input to define or update a custom permission. By way of example, Esther, CEO of Bleak Property, can define the custom permission CanApproveExpenses 216 by inputting values in Fields 312 and clicking or tapping Save Button 316. Esther can navigate to presentation 300 by typing "custom permissions" into Search Bar 304. Message 308 states that there are "no records to display", indicating that no custom permissions have been generated and stored in Permissions Database 200 of FIG. 2A. In some implementations, once custom permissions have been generated and stored in Permissions Database 200, a list of custom permissions stored in Permissions Database 200 can be displayed in lieu of Message 308.

As discussed above, types of custom permissions can vary across implementations. For example, a custom permission can identify a validation rule blocking designated actions unless a user has been assigned the custom permission. By way of example, CanApproveExpenses 216 identifies Validation Rule 320 with Error Condition 324 of FIG. 3. Validation Rule 320 is configured such that whenever an expense report is created or modified, Status Bar 328 is set as "Rejected" or "Approved", and a user does not have the custom permission CanApproveExpenses 216, Validation Rule 320 will block a save from occurring and present an error message "You cannot approve or reject expenses." Validation Rule 320 can be updated or edited by clicking or tapping Edit Button 332.

Also or alternatively a custom permission can identify a rule defining whether a user can make a selection or a rule defining whether a user can view a page or a section of a page. By way of example, a ViewButton custom permission can be defined such that a user can see a button which allows the user to make a selection to deny all pending expense reports. Also or alternatively, a custom permission can identify a rule governing creation, reading, or editing of a record, such as a customer relationship management (CRM) record. Additionally, a custom permission can be a numeric permission governing an amount of user activity. By way of example, a custom permission can be generated which allows a user to print no more than 1000 pages in a given month. A custom permission can also identify a workflow rule. By way of illustration, a junior realtor at Bleak Property can be required to follow a workflow requiring supervisor approval when selling a property whereas a senior realtor can sell a property without supervisor approval.

In some implementations, fields displayed at 108 of FIG. 1 can be configured to receive input to associate a custom permission with a computing resource. For example, CanApproveExpenses 216 has been associated with Status Bar 328 of FIG. 3 because CanApproveExpenses 216 governs whether a user can set Status Bar 328 to "Approved" or "Rejected". Also or alternatively, types of computing resources such as data objects, components, and other entities of a system can vary across implementations. For example, a computing resource might relate to a CRM record stored in a CRM database. For instance, a custom permission might define whether a user can view, edit, or create CRM records.

In some implementations, fields displayed at 108 can be configured to receive input to assign a custom permission to a permission set. By way of example, the Expense Approver 220 permission set can be generated by Esther if she enters defining information into Fields 404 of FIG. 4 and clicks or taps Save Button 408. As described in more detail below, Esther can select a user license for users who will use the Expense Approver 220 permission set by making a selection in User License Menu 412. Esther can select custom permissions to be included in the Expense Approver 220 permission set by clicking or tapping Edit Button 416. Esther can add custom permissions to Expense Approver 220 permission set by selecting custom permissions listed in Available Custom Permissions List 420 and clicking or tapping Add Button 424. Along the same lines, Esther can remove custom permissions from the Expense Approver 220 permission set by selecting custom permissions listed in Enabled Custom Permissions List 428 and clicking or tapping Remove Button 432.

In some implementations, fields displayed at 108 of FIG. 1 can be configured to receive input to assign a permission set to a user. For example, Esther can click or tap Add Assignments Button 504. Esther can then select a user such as demo_approver 508 and click or tap Assign Button 512.

At 112 of FIG. 1, input is received from a user via a user interface on the display of a user device. For example, user input at 112 could be received through any or all user interfaces described above in association with 108. For instance, input to define a custom permission can be entered into Fields 312 of FIG. 3, or input to assign a custom permission to a permission set can be received by a user selecting a custom permission listed in Available Custom Permissions 420 of FIG. 4 and clicking or tapping add button 424.

At 116 of FIG. 1, actions are performed. In some implementations, actions performed at 116 can be performed by servers maintaining Permissions Database 200 of FIG. 2. Such actions can be based on user input received at 112 and can vary across implementations. For example, if user input received at 112 includes a selection to define or update a custom permission, as described above, defining or updating the custom permission can be performed at 116. Similarly, if user input received at 112 includes a selection to associate a custom permission with a computing resource, as described above, associating the custom permission with the computing resource can be performed at 116. Also or alternatively, if user input received at 112 includes a selection to assign a custom permission to a permission set, as described above, assigning the custom permission to the permission set can be performed at 116. Along these lines, if user input received at 112 includes a selection to assign a permission set to a user, as described above, assigning the permission set to the user can be performed at 116.

Returning to FIG. 1, at 120, Permissions Database 200 of FIG. 2 is updated. For example, Permissions Database 200 can be updated to reflect input received at 112 and actions performed at 116 such that the data objects stored in Permissions Database 200 identify a custom permission such as CanApproveExpenses 216 defined or updated at 116 or a permission set to which a custom permission was assigned at 116 such as Expense Approver 220.

In some, but not all implementations, at 124 of FIG. 1, a request to access a computing resource can be sent by a user device and received by a server. By way of example, Richard, a realtor who has not been assigned the Expense Approver 220 permission set attempts to approve an expense report by setting Status Bar 328 of FIG. 6A to "Approved" and clicking or tapping Save Button 604.

In some, but not all implementations, at 128 of FIG. 1, it is determined, that a user is not authorized to access a computing resource. For example, Permissions Database 200 of FIG. 2 can be searched by a server to determine that Richard has not been assigned the CanApproveExpenses 216 custom permission and is, therefore, not authorized to approve expense reports.

In some, but not all implementations, at 132 of FIG. 1, a user is denied access to a computing resource. For example, error message 608 of FIG. 6A can be displayed on Richard's computing device and he can be denied access to approving an expense report responsive to the determination at 128 that Richard is not authorized to approve expense reports.

On the other hand, if Ada Clare, who has the Expense Approver 220 permission set containing the CanApproveExpenses 216 custom permission, attempts to approve an expense report by setting Status Bar 328 of FIG. 6A to "Approved" and clicking or tapping Save Button 604, she can see presentation 612 of FIG. 6B, confirming that the expense report was approved. Also or alternatively, if the Expense Approver 220 permission set contains the ViewButton custom permission, described above, Ada can see and access the Reject All Pending Expenses Button 616.

As mentioned above, some of the disclosed techniques can be implemented in conjunction with a licensing scheme. For example, if a user does not have a needed license for being assigned a permission, the user can be prevented from being assigned the permission. By way of example, Bleak Property only allows users who have paid for a license to view restricted fields or objects on the Bleak Property website. Tulkinghorn, the web administrator at Bleak Property, attempts to assign a permission allowing Hortense, who has not paid for a license, to view restricted fields or objects. Because Hortense has not paid for a license, Tulkinghorn will be prevented from assigning her the permission.

In some implementations, certain permissions can be dependent on other permissions. In other words, when it is determined that a first permission has been enabled, a second permission dependent on the first can automatically be enabled. Along these lines, when it is determined that a first permission has been disabled, a second permission dependent on the first can automatically be disabled. By way of illustration, if the ViewButton permission is dependent on CanApproveExpenses 216 of FIG. 2, ViewButton can be automatically enabled when CanApproveExpenses 216 is enabled and automatically disabled when CanApproveExpenses 216 is disabled.

As discussed above, permission sets can be shared with external systems. Permission sets containing custom permissions, or subsets of such permission sets, can be assigned to computing resources in an external computing system. By way of example, Bleak Property can use the Salesforce.com® platform to generate the Expense Approver 220 permission set. The Expense Approver 220 permission set can be shared with Concur® such that only Bleak Property employees having the Expense Approver 220 can approve expense reports for Bleak Property employees on the Concur® platform.

In some implementations, a subset of a permission set defined in a computing system such as Salesforce.com® can be assigned to users of an external computing system. The subset of the permission set can define a license associated with the external system. By way of example, an independent software vendor (ISV) might want to generate a permission set containing custom permissions, which defines a user license to print for users of the ISV's system. The ISV can generate the permission set defining the license to print using the Salesforce.com® system and share the permission set with the ISV's external system. Thus, the ISV can use custom permissions generated in the Salesforce.com® system to declaratively define licenses for its own external system.

Also or alternatively, as described above, some of the disclosed techniques can be used to create a source of truth for permissions, which can be shared across systems. For example, external systems can request and be provided access to Permissions Database 200 of FIG. 2.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 7A:
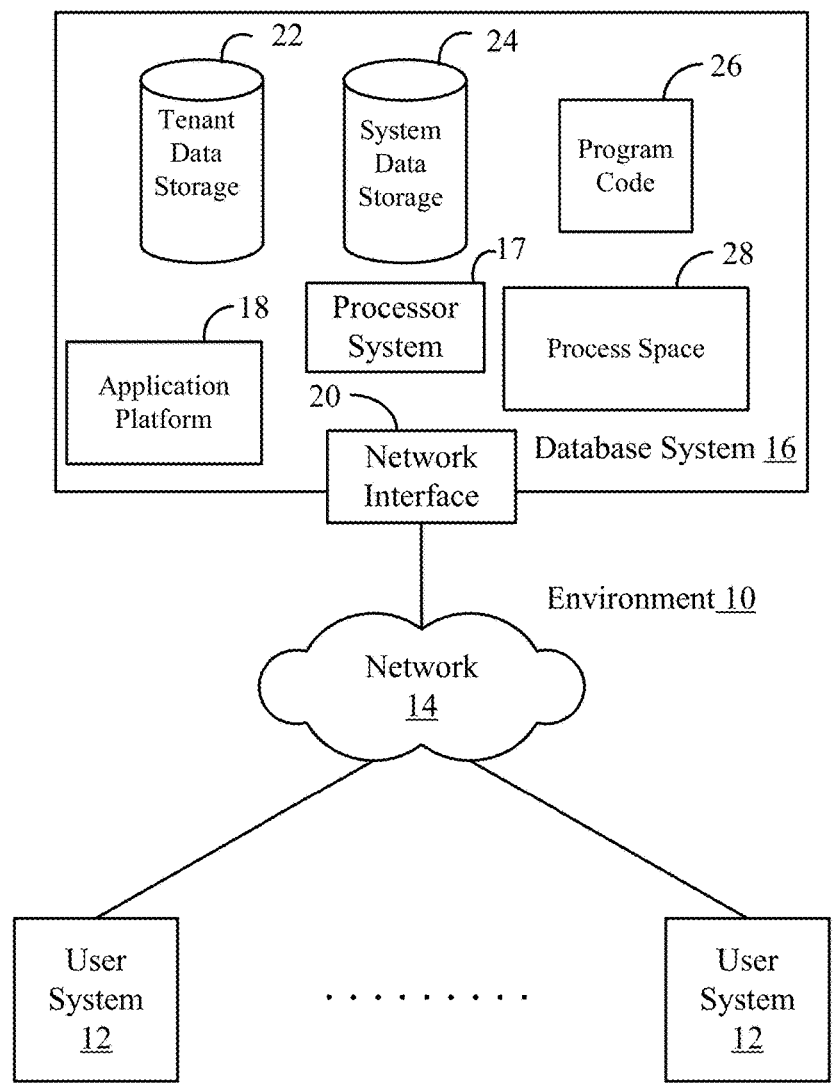
FIG. 7A shows a block diagram of an example of an environment 10 in which an on-demand database service can be used in accordance with some implementations.

FIG. 7A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7B:
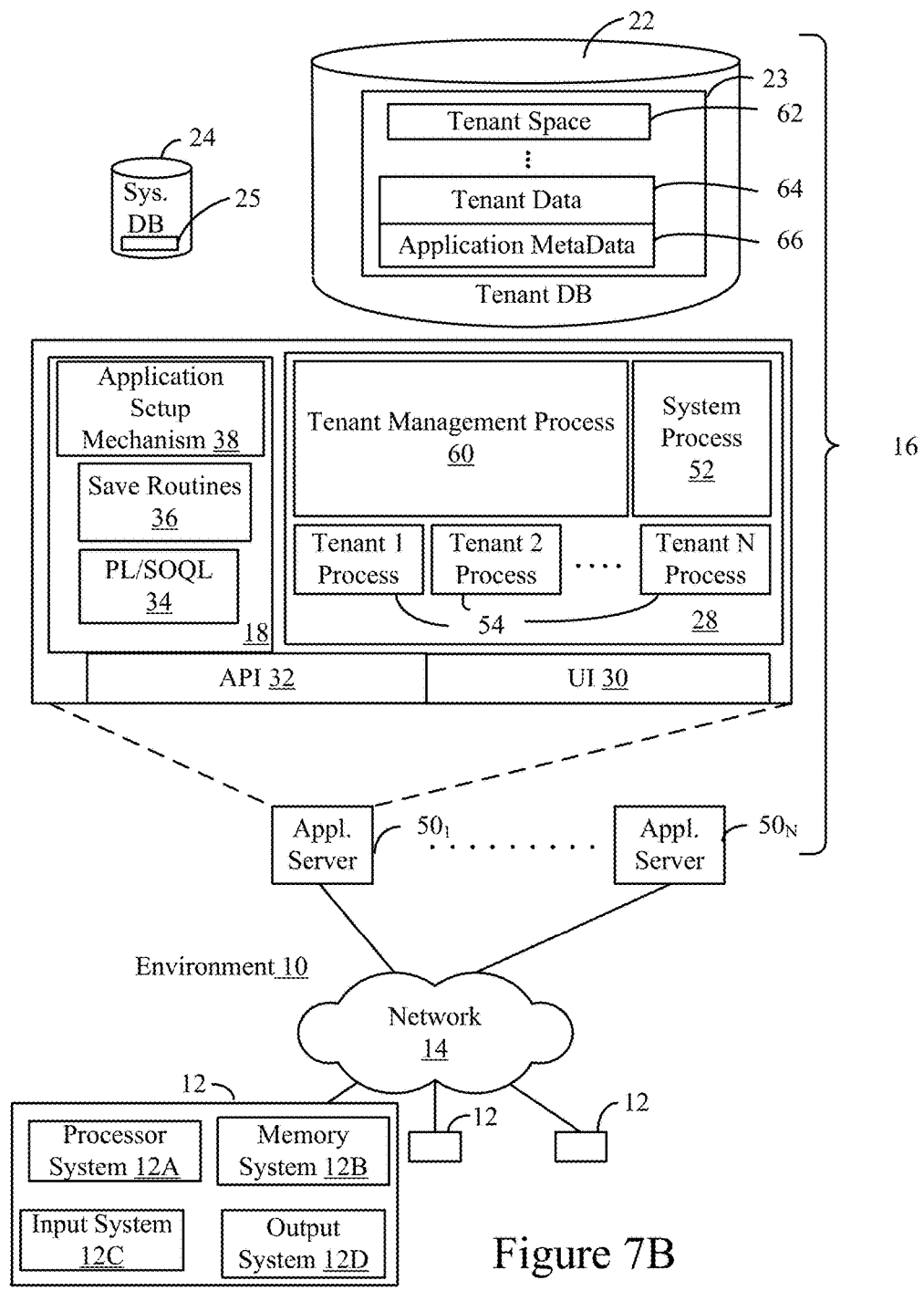
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 7B shows network 14 and system 16. FIG. 7B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8A:
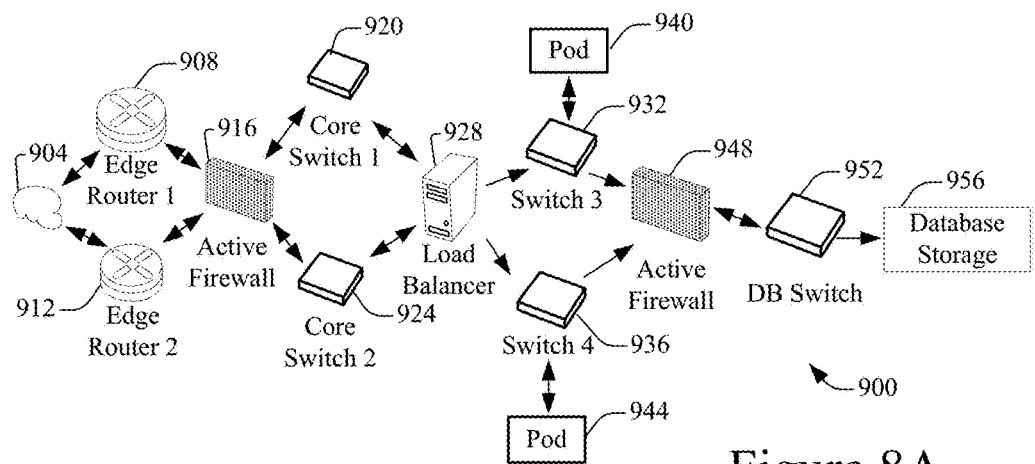
FIG. 8A shows a system diagram of an example of architectural components of an on-demand database service environment 900, in accordance with some implementations.

FIG. 8A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 8B:
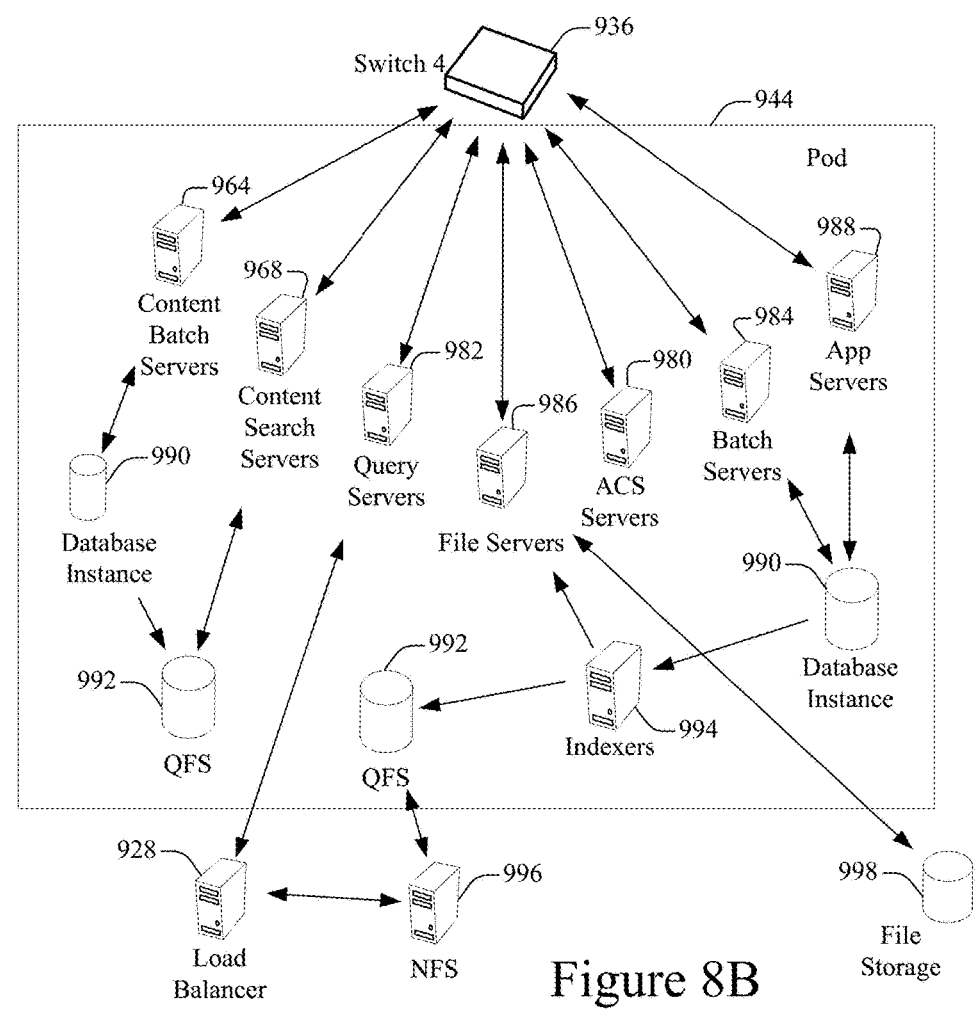
FIG. 8B shows a system diagram further illustrating an example of architectural components of an on-demand database service environment, in accordance with some implementations.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 8B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to cause performance of services described herein, including performance of one or more of the operations of methods described herein with reference to FIGS. 1-6B. In alternative implementations, two or more app servers 988 may be included to cause such methods to be performed, or one or more other servers described herein can be configured to cause part or all of the disclosed methods to be performed.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system comprising one or more hardware processors, the database system configurable to cause:
providing user interface data to a user device, the user interface data configured to be processed to cause display, in a user interface on a display of the user device, of one or more fields configured to receive input data for performing one or more of: defining or updating a custom permission, associating a custom permission with a computing resource, assigning a custom permission to a permission set, or assigning a permission set to a user;
generating or updating, based on first input from a first user via the user interface on the display of the user device, a custom permission;
associating, based on second input from the first user via the user interface on the display of the user device, the custom permission with a first computing resource;
assigning, based on third input from the first user via the user interface on the display of the user device, the custom permission to the first permission set;
identifying a rule associated with the custom permission, the rule governing performance of one or more actions in association with the database system;
providing further user interface data to the user device, the further user interface data configured to be processed to cause display, in the user interface, of one or more user-configurable parameters of the rule; and
generating or updating one or more data objects maintained in a database, the one or more data objects indicating custom permissions, permission sets and permission relationships among entities in a computing system for governing user access to computing resources in the computing system.

2. The system of claim 1, wherein an operational characteristic of a permission is independent of whether the permission is user-defined.

3. The system of claim 1, the database system further configurable to cause:
determining, responsive to a request from a second user to access a second computing resource, using the one or more data objects in the database, that the second user is not authorized to access the second computing resource; and
denying, responsive to determining that the second user is not authorized to access the second computing resource, the second user access to the second computing resource.

4. The system of claim 1, wherein the rule is one of: a validation rule blocking designated actions unless a user has the custom permission, a rule defining whether a user can make a selection, a rule defining whether a user can view a page or a section of a page, a workflow rule, a rule governing creation, reading, or editing of a record, or a numeric permission governing an amount of user activity.

5. The system of claim 1, the database system further configurable to cause:
determining that a first permission has been enabled; and
enabling, responsive to determining that the first permission has been enabled, a second permission.

6. The system of claim 1, wherein the first computing resource is associated with one or more customer relationship management (CRM) records stored in a CRM database.

7. The system of claim 1, the database system further configurable to cause:
associating a subset of a permission set with one or more objects in a system external to the computing system; and
assigning one or more users to the subset of the permission set.

8. The system of claim 7, the database system further configurable to cause:
providing, responsive to receiving a request from the external system to access the database, the external system with access to the database.

9. The system of claim 8, wherein the subset of the permission set defines a first license associated with the external system.

10. A database-implemented method comprising:
providing user interface data to a user device, the user interface data configured to be processed to cause display, in a user interface on a display of the user device, of one or more fields configured to receive input data for performing one or more of: defining or updating a custom permission, associating a custom permission with a computing resource, assigning a custom permission to a permission set, or assigning a permission set to a user;
generating or updating, based on first input from a first user via the user interface on the display of the user device, a custom permission;
associating, based on second input from the first user via the user interface on the display of the user device, the custom permission with a first computing resource;
assigning, based on third input from the first user via the user interface on the display of the user device, the custom permission to the first permission set;
identifying a rule associated with the custom permission, the rule governing performance of one or more actions in association with the database system;
providing further user interface data to the user device, the further user interface data configured to be processed to cause display, in the user interface, of one or more user-configurable parameters of the rule; and
generating or updating one or more data objects maintained in a database, the one or more data objects indicating custom permissions, permission sets and permission relationships among entities in a computing system for governing user access to computing resources in the computing system.

11. The method of claim 10, wherein an operational characteristic of a permission is independent of whether the permission is user-defined.

12. The method of claim 10, further comprising:
determining, responsive to a request from a second user to access a second computing resource, using the one or more data objects in the database, that the second user is not authorized to access the second computing resource; and
denying, responsive to determining that the second user is not authorized to access the second computing resource, the second user access to the second computing resource.

13. The method of claim 10, wherein the rule is one of: a validation rule blocking designated actions unless a user has the custom permission, a rule defining whether a user can make a selection, a rule defining whether a user can view a page or a section of a page, a workflow rule, a rule governing creation, reading, or editing of a record, or a numeric permission governing an amount of user activity.

14. The method of claim 10, further comprising:
determining that a first permission has been enabled; and
enabling, responsive to determining that the first permission has been enabled, a second permission.

15. A computer program product comprising computer-readable program code capable of being executed by one or more processors when retrieved from a non-transitory computer-readable medium, the program code comprising instructions configurable to cause:
providing user interface data at a user device, the user interface data configured to be processed to cause display, in a user interface on a display of the user device, of one or more fields configured to receive input data for performing one or more of: defining or updating a custom permission, associating a custom permission with a computing resource, assigning a custom permission to a permission set, or assigning a permission set to a user;
generating or updating, based on first input from a first user via the user interface on the display of the user device, a custom permission;
associating, based on second input from the first user via the user interface on the display of the user device, the custom permission with a first computing resource;
assigning, based on third input from the first user via the user interface on the display of the user device, the custom permission to the first permission set;
identifying a rule associated with the custom permission, the rule governing performance of one or more actions in association with the database system;
providing further user interface data to the user device, the further user interface data configured to be processed to cause display, in the user interface, of one or more user-configurable parameters of the rule; and
generating or updating one or more data objects maintained in a database, the one or more data objects indicating custom permissions, permission sets and permission relationships among entities in a computing system for governing user access to computing resources in the computing system.

16. The computer program product of claim 15, wherein an operational characteristic of a permission is independent of whether the permission is user-defined.

17. The computer program product of claim 15, the instructions further configurable to cause:
determining, responsive to a request from a second user to access a second computing resource, using the one or more data objects in the database, that the second user is not authorized to access the second computing resource; and
denying, responsive to determining that the second user is not authorized to access the second computing resource, the second user access to the second computing resource.

18. The computer program product of claim 15, wherein the rule is one of: a validation rule blocking designated actions unless a user has the custom permission, a rule defining whether a user can make a selection, a rule defining whether a user can view a page or a section of a page, a workflow rule, a rule governing creation, reading, or editing of a record, or a numeric permission governing an amount of user activity.

19. The computer program product of claim 15, the instructions further configurable to cause:
determining that a first permission has been enabled; and
enabling, responsive to determining that the first permission has been enabled, a second permission.

20. The computer program product of claim 15, the instructions further configurable to cause:
providing, responsive to receiving a request from the external system to access the database, the external system with access to the database.

* * * * *